June 2, 1964   R. E. McKINNEY   3,135,432
DISCHARGE APPARATUS FOR BINS
Filed Dec. 31, 1962   2 Sheets-Sheet 1

INVENTOR.
RALPH E. McKINNEY
BY OLSEN &
STEPHENSON

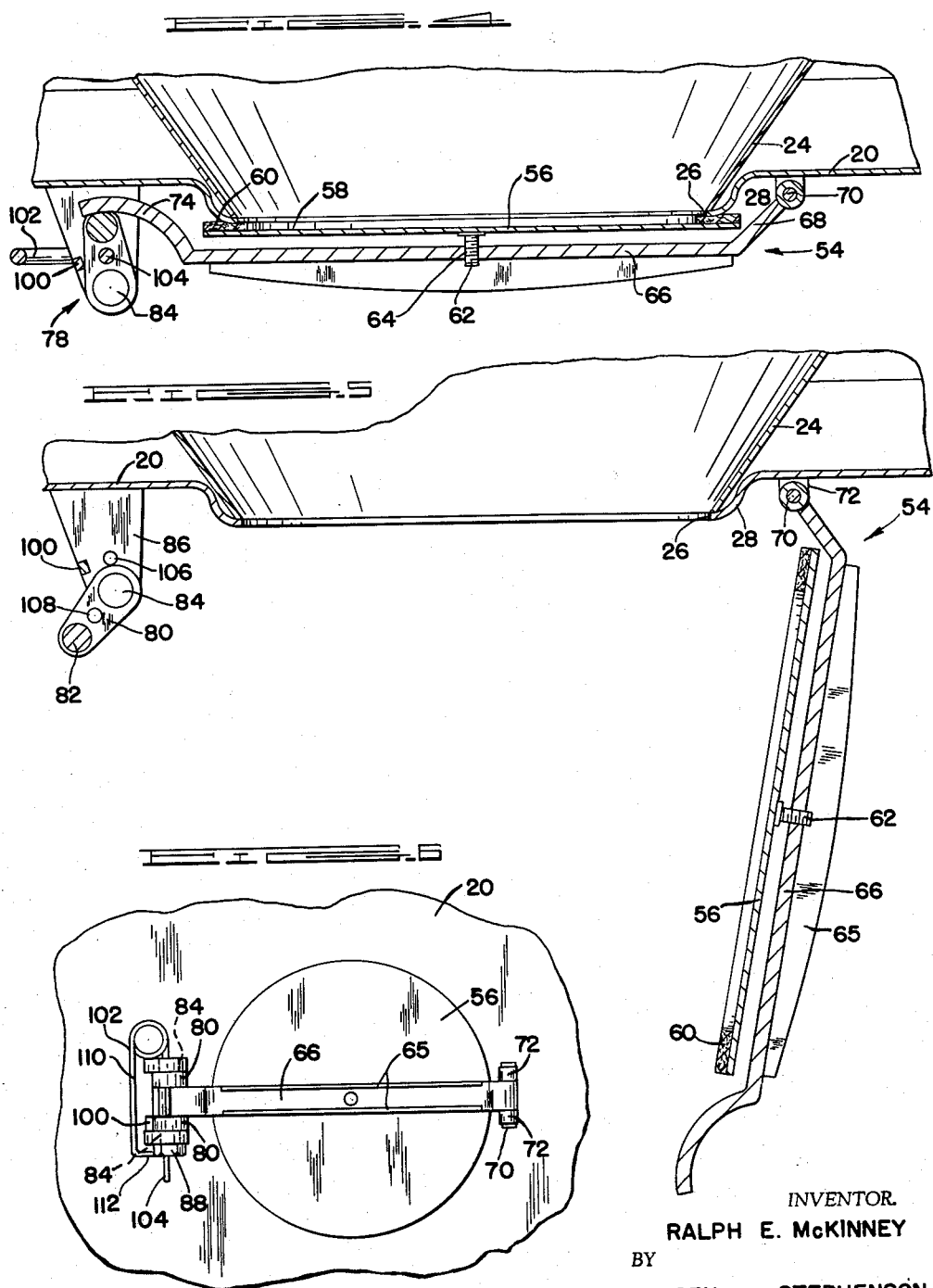

United States Patent Office 3,135,432
Patented June 2, 1964

3,135,432
DISCHARGE APPARATUS FOR BINS
Ralph E. McKinney, Beatrice, Nebr., assignor to Hoover Ball and Bearing Company, Saline, Mich., a corporation of Michigan
Filed Dec. 31, 1962, Ser. No. 248,724
6 Claims. (Cl. 222—185)

This invention relates generally to large gravity discharge bins or containers for storing and transporting granular and like materials and more particularly to an improved discharge apparatus for bins of this type. This application is a continuation-in-part of my prior application Serial No. 147,686 filed October 25, 1961, now Patent No. 3,104,035.

In some material handling systems a bottom discharge bin is desirable. In such systems the bin may discharge directly into a floor or other opening or it may be arranged to discharge into a screw or other type conveyor. In any case it is desirable to provide a closure for the bottom discharge opening which can be readily actuated to uncover the opening and a stand or mounting for the bin which includes a hopper that is in dust-tight relation to the bin to insure a dust-free discharge operation when powdery granular material is being discharged from the bins. Some prior bins require both power or manual opening and closing of the closure, thus requiring costly mechanisms for operating the closure. Other prior bins of this type have, by virtue of the type of closures and bin mountings involved, required a cloth or similar discharge sleeve which is secured to the bin so that it extends downwardly from the discharge opening and when not in use is tucked in the bin inside the discharge opening closure. In a bin requiring such a sleeve it is necessary to reach into the bin to pull the sleeve out, and in the event the bin is filled with a caustic or other material dangerous to humans, such contact with the bin material is undesirable. It is an object of this invention therefore to provide an improved dust-free discharge station for bins, and a closure assembly for bin openings which is readily released at such station to discharge the bin contents.

A further object of this invention is to provide a stand and hopper assembly which supports a bin in a position to discharge into the hopper and is provided with clearance space to accommodate the closure when it is moved to an open position so that it does not obstruct the discharge of material from the bin, and a closure assembly which can be readily released by access through a closable opening in the hopper so as to permit discharge of the bin without spilling the bin contents or contaminating the area of the bin with the dust and powder from the bin.

Still another object of this invention is to provide improved discharge apparatus for a gravity discharge bin which includes a spring mounted hopper having a seal to provide a dust-tight engagement of the hopper and the bin prior to discharge of the bin contents to thereby insure a dust-free discharge station.

Further objects, features and advantages of this invention will become apparent from a consideration of the following description, the appended claims, and the accompanying drawing in which:

FIGURE 4 is a fragmentary sectional view of the lower portion of the bin shown in FIG. 1, showing the bottom discharge opening in the bin and illustrating the closure assembly of this invention in a closed and locked position;

FIGURE 5 is a fragmentary vertical sectional view of the lower portion of the bin, illustrated similarly to FIG. 4, and showing the closure assembly in an open position; and FIGURE 6 is a fragmentary bottom view of the bin showing the closure assembly in a closed and locked position.

Figure 1:
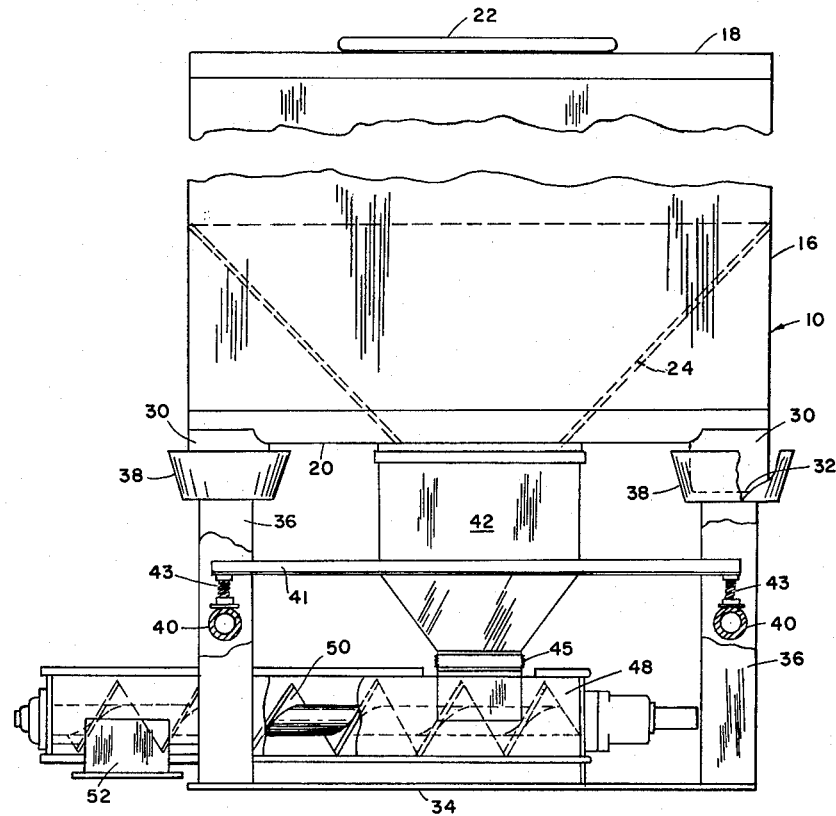
FIGURE 1 is a side elevational view of a bottom discharge bin provided with the improved closure assembly of this invention and mounted on a stand for discharging into a screw conveyor with some parts broken away for purposes of clarity.

With reference to the drawing, a bottom discharge bin 10 is illustrated in FIG. 1 mounted on a stand or frame 12 for feeding the contents of the bin into a screw conveyor 14. The bin 10 consists of a body 16 which is generally rectangular in cross section and has a top wall 18 and a bottom wall 20. A filling opening (not shown) is provided in the top wall 18 and is closed by a removable cover 22. Adjacent its lower end, the body 16 is fitted with an interior hopper 24 which communicates at its lower end with an opening 26 in the bottom wall 20. As best appears in FIG. 4, the bottom wall 20 is provided with a downwardly extending flange 28, which is shown integral with the bottom wall 20 but which may be separately secured as by welding to the wall 20, or formed as an extension of the hopper 24, and the opening 26 is at the lower end of the flange 28. The bin 10 is also provided with four downwardly extending supporting legs 30 which are located adjacent the corners of the bottom wall 20 and project downwardly so that their lower ends 32 are located below the discharge opening 26.

The supporting stand or frame 12 consists of a base 34 which is substantially horizontal and has four upstanding legs 36 mounted thereon and arranged in pairs. Each pair of legs 36 are connected at their upper ends by an elongated trough or receptacle 38 which is of a length and width such that a pair of bin legs 30 can be supported therein. A tubular support member 40, which is substantially horizontal, connects the legs 36 in each pair intermediate their upper and lower ends. An upright hopper 42 disposed substantially centrally of the four legs 36 has a pair of elongated angle members 41 secured to opposite sides thereof. Each angle member 41 is supported adjacent its ends on the upper ends of a pair of coil springs 43, the lower ends of which are supported on the tubular members 40. The springs 43 thus function to yieldably support the hopper 42 and urge the hopper 42 in an upward direction. The upper end of the hopper 42 is open and is bounded by a gasket or seal member 44 which is formed of a resilient yieldable material such as rubber and is supported in an angle shape rim 46 secured to the upper end of the hopper 42. The lower end of the hopper 42 carries a flexible sleeve 45 which is secured to and discharges into a horizontally extending tube or housing 48. A screw 50 is rotatably mounted in the housing 48 for conveying material from the discharge end of the hopper 42 to an outlet conduit 52 mounted on the tube 48.

The springs 43 push the hopper 42 upwardly to a position in which the seal 44 is substantially above the leg receptacles 38 when there is not a bin supported on the stand 12. When the bin 10 is lowered toward the stand 12, the portion of the bottom wall 20 surrounding the recessed portion 28 first engages the seal 44 and compresses it so that it is in tight sealing engagement with the bin bottom wall 20 concurrently with moving the hopper 42 down to compress the springs 43. The bin legs 30 then contact and are supported on the receptacles 38 at a position such that the sealing engagement of the seal 44 with the bin bottom wall 20 is maintained. The springs 43 and the seal 44 thus cooperate to insure a dust-tight engagement of bin bottom wall 20 and hopper 42.

The closure assembly, indicated generally at 54 (FIGS. 4 and 5), for the bin opening 26 includes a circular cover member 56 which is provided on its top surface 58 with an annular sealing gasket 60 which is of a diameter to engage the bottom wall portion 28 at a position surrounding the opening 26. A threaded stud 62 is secured to the bottom side of the cover member 58 and extends downwardly therefrom at a position in substantially axial alignment with the bin opening 26 when the cover 56 is in a position closing the opening 216. The stud 62 is supported in a threaded opening 64 in a cover retainer bar 66 which extends diametrically across the cover 56, and is provided with reinforcing ribs 65. The retainer bar 66 is formed at one end with an inclined end portion 68 which is connected by a shaft 70 to ears 72 which are secured to and project downwardly from the bin bottom wall 20 so that the retainer bar 66 is pivotally movable toward and away from the opening 26 about the shaft 70. The bar 66 is also formed with an opposite end portion 74 which, in the position of the bar 66 shown in FIG. 4, is curved upwardly toward the bin bottom wall 20.

It can thus be seen that the cover member 56 is supported on the retainer bar 66 which is in turn pivotally supported at one end on the bin bottom wall 20 so that it is movable toward and away from the bin discharge opening 26 to either close the opening 26 (FIG. 4) or uncover the opening 26 (FIG. 5). In the position of the retainer bar 66 in which it holds the cover 56 in a position closing the opening 26, the cover 56 may be locked in its closed position by manipulation of a locking and release assembly 78 which coacts with the curved end portion 74 of the retainer bar 66. The assembly 78 includes a pair of horizontally spaced rocker arms 80 which are connected adjacent one of their ends by a locking pin 82. Adjacent their opposite ends, the rocker arms 80 are provided with stub shafts 84 which are rotatably supported in a pair of downwardly extending ears 86 secured to the bin bottom wall 20. One of the stub shafts 84 projects through an ear 86 and is provided with a hex-shape head 88 for a purpose to appear presently.

In the use of the closure assembly 54 assume that the bin 10 has been mounted on the stand 12 as previously described and as shown in FIG. 1 so that the closure assembly 54 and the locking and release assembly 78 project into the upper end of the hopper 42. The hopper seal 44 is thus in dust-tight engagement with the bin bottom wall 20 prior to any discharge of the bin contents. As a result the discharge station is maintained free of any of the dust which results from fines in the bin contents, when the bin contents are emptied into the hopper 42.

Figures 2, 3:
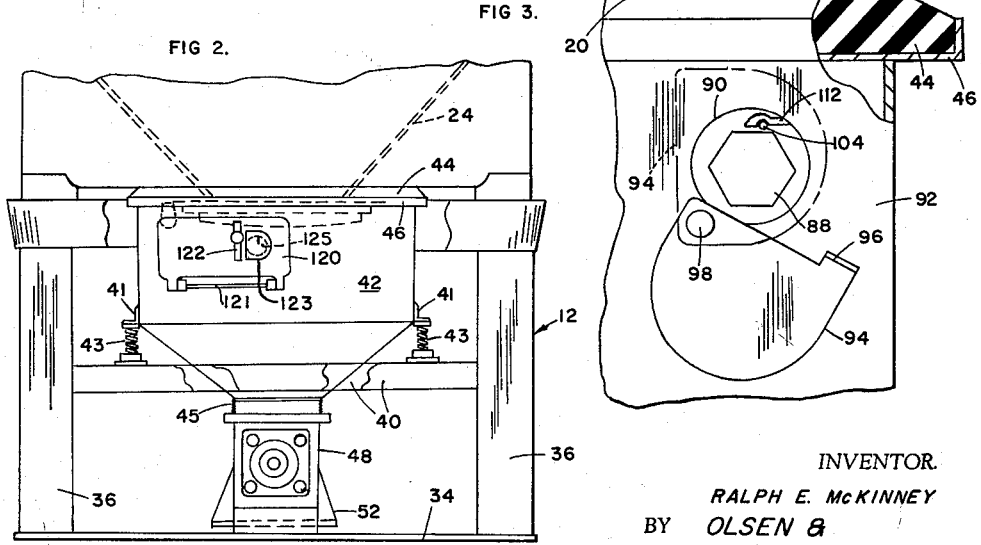
FIGURE 2 is a fragmentary elevational view of one end of the apparatus shown in FIG. 1.
FIGURE 3 is an enlarged fragmentary elevational view of a portion of the opposite end of the apparatus shown in FIG. 1, with some parts broken away and other parts shown in section for the purpose of clarity.

In the supported position of the bin 10 on the stand 12, the stub shafts 84 and the hex-shape head 88 on one of the stub shafts 84 are axially aligned with an opening 90 (FIG. 3) formed in one side wall 92 of the hopper 42. The opening 90 is normally closed by a cover plate 94 which is pivotally connected to the hopper side wall 92 by a rivet 98 and is provided at one corner with an outwardly extending tab 96 to facilitate manual manipulation of the plate 84. In order to release the locking and release assembly 78, a tool (not shown) is inserted through the opening 90 into gripping engagement with the hex head 88 on one of the stub shafts 84. The hex head 88 is then rotated in a direction to rotate the rocker arms 80 in a clockwise direction as shown in FIG. 4 to a position in which the locking pin 82 is out of the path of travel of the retainer bar end portion 74 when the bar 66 swings downwardly, in response to the force of the material in the bin 10 on the cover 56. The closure assembly 54 then swings downwardly to a position within the hopper 42 to a position, such as is shown in FIG. 5, in which it does not obstruct the flow of material from the bin 10 through the opening 26 and through the hopper 42 to the screw conveyor tube 48. It is to be understood that while the hopper 42 has been shown as communicating with a screw conveyor, it may, if desired, merely communicate with a floor opening or other conveyor.

When the bin 10 is empty, a door 120, mounted on a hinge pin 121 on one side wall of hopper 42 and having a release handle 122, may be opened so that an attendant can reach into hopper 42 and close the assembly 54. For safety purposes it is desirable to enable such closing prior to lifting the bin 10 off the stand 12. A movable cover 123 on the door 120 may be moved to a position in which the attendant may look through a hole 125 in door 120 to determine that bin 10 is empty. The closure assembly 54 is manually moved from its position shown in FIG. 5 to a closed position in which the gasket 60 engages the bin bottom wall. The bar end portion 74 is shaped so that in a retaining position of the bar 66 the under surface of the portion 74 is located approximately on the arc traveled by the locking pin 82 when it is swung upwardly about the stub shafts 84. In the initial closed position of the assembly 54 the undersurface of the bar end portion 76 is preferably located slightly below the arc traveled by the locking pin 82 when it is moved to its locking position shown in FIG. 4. As a result, when the arms 80 are rotated in a counterclockwise direction toward the position shown in FIG. 4, the locking pin 82 rides upwardly on the retainer bar end portion 74 so as to exert an upwardly directed force on the retainer bar 66 which is in turn transmitted to the cover 56 as an upwardly directed force located substantially at the axis of the opening 26, to thereby urge the seal 60 into pressure tight engagement with the bin bottom wall 20.

If desired, the under surface of the retainer bar end portion 74 may be provided with a coating or pad of a low friction material to facilitate travel of the locking pin 82 thereon. The application of a force to the cover member 56 which is substantially axially aligned with the opening 26 provides for a tight sealing engagement of the gasket 60 with the bottom wall portion 28 entirely around the opening 26 so that there is no tendency of the cover 56 to tilt or bend relative to the opening 26. The desired pressure engagement of the seal member 60 with the wall portion 28 is obtained by rotating the cover 56 and the stud 62 relative to the retainer bar 66 prior to closing movement of the assembly 54.

The arms 80 are rotated to a stop position in which one of the arms 80 engages a lateral projection 100 on one of the ears 86. The projection 100 is positioned such that when the arm 80 is in engagement with it, the vertical plane of the axis of the stub shafts 84 is located between the vertical plane of the axis of the locking pin 82 and the retainer bar pivotal shaft 70. As a result, when the bin 10 is refilled, the weight of the material therein on the cover member 56 acts to urge the locking pin 82 in a direction opposite to the direction in which it must be moved to release the retainer bar 66 and in a direction holding an arm against the projection 100. Consequently, the locking and release assembly 78 cannot be accidentally moved to a release position without first overcoming the force of the material in the bin 10 on the locking pin 82.

As a further precaution against accidental movement of the assembly 78 to release the closure assembly 54, a safety pin 102 may be installed on the assembly 78 as shown in FIGS. 4, 5 and 6. The safety pin 102 includes a first straight wire portion 104 which is extended through aligned openings 106 in the ears 86 and openings 108 in the arms 80 when the arms 80 are in their locking positions shown in FIG. 4. The safety pin 102 includes a second wire portion 110 which terminates in a laterally extending hook section 112 (FIG. 3) which is engaged with the straight portion 104. When the safety pin 102 is used, it is removed prior to mounting of the bin 10 on the stand 12 for the purpose of discharging the bin contents into the hopper 42.

From the above description it is seen that this invention provides a dust-free discharge station assembly for a bottom discharge bin 10 that includes a spring mounted hopper 42 and a closure assembly 54 which is maintained in a closed position by the force of the bin contents on the closure assembly. Furthermore, the closure release assembly 78 is constructed so that the closure assembly 54 may be readily released after the bin 10 is mounted on the stand 12 in dust-tight engagement with the hopper 42 which is constructed to provide access, through the opening 90, to the release assembly 78. As a result, no contact of personnel with the bin contents is required during emptying of the bin contents into the bin hopper 42. Another advantage of the release assembly 78 is its adaptability to remote automatic actuation. If desired an actuating air cylinder can be mounted on the hopper wall 92 adjacent the opening 90 and a suitable linkage can be extended between either of the stub shafts 84 and the air cylinder, so that on operation of the air cylinder the shafts 84 are rotated in a clockwise direction as viewed in FIG. 4.

It will be understood that the bin closure assembly which is herein disclosed and described is presented for purposes of explanation and illustration and is not intended to indicate limits of the invention, the scope of which is defined by the following claims.

What is claimed is:

1. In combination a bin having a bottom wall provided with a discharge opening, supporting legs extending downwardly from said bottom wall, a discharge stand for said bin having bin leg supporting means, a hopper mounted on said stand and having an open upper end, gasket means on the upper end of said hopper sealingly engageable with said bin bottom wall at a position surrounding said bottom wall in a position of said bin legs supported on said stand, closure means for said discharge opening pivotally supported on said bin at one side of said discharge opening, a closure release assembly mounted on said bottom wall on the opposite side of said discharge opening, said closure release assembly extending into the upper end of said hopper in said supported position of said bin, and means providing an access opening in said hopper to provide access to said closure release assembly in a supported position of said bin on said stand.

2. The combination according to claim 1 in which said closure release assembly includes substantially horizontal shaft means rotatable to release said closure, said shaft means being positioned in substantially horizontal alignment with said hopper access opening in said supported position of said bin.

3. In combination, a bin having a bottom wall provided with a discharge opening, a closure for said discharge opening, a closure release assembly mounted on said bottom wall to one side of said discharge opening and including substantially horizontal actuating shaft means, a discharge stand for said bin, a hopper mounted on said stand having an open upper end positioned to surround said discharge opening in a position of said bin supported on said stand, means providing an access opening in said hopper at a position substantially horizontally aligned with said shaft means to provide access to said closure release assembly in a supported position of said bin on said stand, and closable cover means for said access opening mounted on said hopper.

4. In combination, a bin having a bottom wall provided with a discharge opening, supporting legs extending downwardly from said bottom wall, a discharge stand for said bin comprising an upright frame having bin leg supporting means, a hopper having an open upper end, means on said frame yieldably supporting said hopper and urging said hopper in an upward direction, yieldable gasket means on the upper end of said hopper sealingly engageable with said bin bottom wall at a position surrounding said discharge opening in a position of said bin legs supported on said stand, and closure means for said discharge opening mounted on said bottom wall.

5. In combination, a bin having a bottom wall provided with a discharge opening, a closure for said discharge opening, a closure release assembly mounted on said bottom wall to one side of said discharge opening, a dust tight discharge station for said bin comprising a discharge stand for supporting said bin at a position in which said bottom wall is at the lower end thereof, a hopper having an open upper end of a size to surround said discharge opening, spring means on said stand yieldably supporting said hopper and urging said hopper upwardly so that the upper end thereof will sealingly engage said bin bottom wall, and means providing an access opening in said hopper to provide access to said closure release assembly in a supported position of said bin on said stand.

6. The combination according to claim 5 in which said closure release assembly includes substantially horizontal shaft means rotatable to release said closure, said shaft means being positioned in substantially horizontal alignment with said hopper access opening in said supported position of said bin.

References Cited in the file of this patent

UNITED STATES PATENTS

| | | |
|---|---|---|
| 880,075 | Halloran | Feb. 25, 1908 |
| 1,501,068 | Schatz | July 15, 1924 |
| 1,937,232 | Kuehling | Nov. 28, 1933 |
| 2,622,771 | Tulou | Dec. 23, 1952 |
| 2,774,515 | Johansson et al. | Dec. 18, 1956 |
| 3,104,035 | McKinney | Sept. 17, 1963 |